Patented Dec. 5, 1933

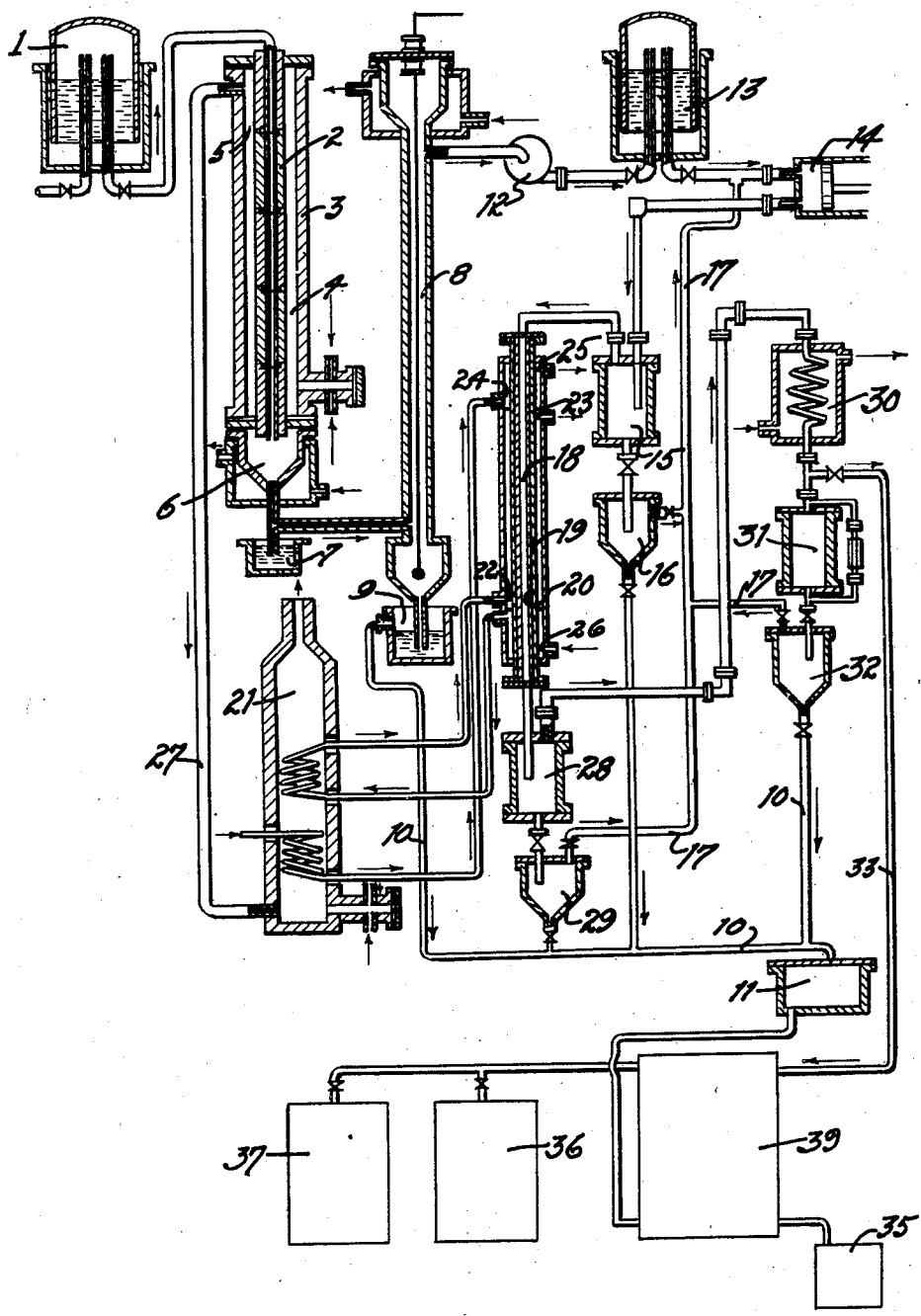

1,937,619

UNITED STATES PATENT OFFICE 1,937,619

PRODUCTION OF NONKNOCKING MOTOR FUELS AND LUBRICATING OILS

Fritz Winkler, Hans Haeuber, and Paul Feiler, Ludwigshafen - on - the - Rhine, Germany, assignors to I. G. Farbenindustrie Aktiengesellschaft, Frankfort-on-the-Main, Germany Application January 15, 1932, Serial No. 586,760, and in Germany January 23, 1931

2 Claims. (Cl. 196—10)

The present invention relates to improvements in and apparatus for the production of nonknocking motor fuels and lubricating oils from paraffin hydrocarbons.

It has already been proposed to dehydrogenate (if desired while splitting) paraffin hydrocarbons from any source and to subject the resulting gaseous olefines to a polymerization at elevated temperatures, if desired also at increased pressure, in order thus to obtain non-knocking motor fuels or lubricating oils by further condensation of the polymerization products, for example with the aid of condensing agents of the Friedel Craft type, such as aluminium chloride.

In the processes of this kind hitherto known, metal apparatus or periodically heatable reaction chambers of highly refractory ceramic material are used. In the former case the usefulness of the apparatus is very limited, firstly by the limited stability to temperature of the metallic constructional materials, even highly refractory special alloys (the general employment of which is limited by their high price) not allowing of heating to temperatures of 1,000° C. and more for continuously operating for a long time and secondly by the danger of corrosion resulting from the sulphur content of the crude initial materials, caused by the hydrogen sulphide formed in the reaction chamber or by the carbon produced by reason of the ready decomposability of the sulphur compounds.

We have now found that the said objections are obviated by dehydrogenating gaseous or vaporous paraffin hydrocarbons from any source, with the formation of gaseous or gaseous and vaporizable unsaturated hydrocarbons, in apparatus the hot parts of which come into contact with the reaction materials, are partly or wholly prepared from metallic silicon or materials containing the same under the reaction conditions, all or a part of the condensable constituents liquid at ordinary temperature, and, if desired also hydrogen and part or all of the methane, being separated in any usual manner from the effluent gases and the residual gas subjected to a second thermal treatment in a silicon apparatus as hereinbefore described, for the purpose of producing liquid products, the liquid products obtained in the two stages being further worked up into non-knocking motor fuels and very viscous oils. For sake of brevity gaseous and vaporous hydrocarbons are hereinafter referred to as "vaporized" hydrocarbons. For the purpose of the present invention we understand by "dehydrogenation" the mere splitting off of hydrogen with the formation of unsaturated compounds as well as cracking, in which latter process, as is known, also formation of unsaturated hydrocarbons (having a lower number of carbon atoms in the molecule than the initial materials) takes place.

Contrasted with the known methods, the employment of the said silicon apparatus constitutes a considerable advance.

The masses containing free metallic silicon may be exposed to very high temperatures and are entirely stable to sulphur. A deposition of carbon which unfavorably influences the reaction in any way practically does not take place, not even when the reaction is effected at high temperatures, as for example those of 800° C. and more. If tubular vessels are employed, a subsequent cleaning thereof from solid masses deposited for example on account of inadsorbent working may be conveniently effected at any time by simply blowing air therethrough at elevated temperatures. The material comprising silicon should preferably contain more than 30 per cent of free metallic silicon. If the reaction vessels are constructed only of a material comprising silicon the walls of this vessel should be more than 5 millimeters in thickness, in order to secure the requisite mechanical stability of the vessel. If the inner walls, comprising silicon, of the said vessels are supported by another material, as for example a refractory metal, these walls should preferably be more than 3 millimeters in thickness in order to provide that a compact mantle of a material comprising silicon which is impermeable to gas surrounds the reacting materials.

In addition to the said advantages, the masses containing metallic silicon also have excellent catalytic properties so that not only the conversion of the paraffin hydrocarbons but also the subsequent conversion of the olefines may be so led at any time that the formation of naphthalene or other higher aromatic hydrocarbons practically does not take place in spite of high temperatures and that at the same time valuable products, such as diolefines, as for example, butadiene, styrene or ethyl benzene and the like are formed which may be recovered separately. This may be attained for example by working at not too high temperatures and with high velocities of flow.

The first step of the present process is carried out at temperatures between 400° and 1100° C. The particular temperature employed depends on the nature of the initial materials and on the pressure used. With higher molecular paraffinic hydrocarbons, such as straight run benzine, lower temperatures are necessary than with low molecular hydrocarbons, as for example ethane or especially methane. At slightly elevated pressures the temperature may be lower than at atmospheric pressure, at which pressure above 600° C. are preferably employed. The subsequent conversion of the olefines is effected at temperatures ranging between 400° and 650° C., preferably between 500° and 550° C. The pressures to be employed are between 20 and 300 atmospheres, preferably between 50 and 100 atmospheres. Temperatures and pressures are interdependent and dependent also on the content of olefines in the initial gases and on the velocity of flow employed.

It is preferable to work at atmospheric pressure in the first stage though slightly decreased or increased pressures, as for example 5 or 10 atmospheres may be employed. The second stage is carried out at elevated pressure. In this way especially good yields of valuable liquid hydrocarbons are obtained. For example the effluent gases and vapors may be freed from the misty reaction products at atmospheric pressure, the gas mixture compressed, the constituents thus liquefied such as benzene and the like, separated and the residual gas, which is under pressure, supplied to the second stage. The liquid products obtained in both stages, by reason of their content of aromatic hydrocarbons of low boiling point on the one hand and of unsaturated aliphatic hydrocarbons of low molecular weight on the other hand, constitute excellent initial materials for the preparation of non-knocking benzines and very viscous lubricating oils having a blue fluorescence. The formation of very valuable lubricating oils from the liquid products resulting in the first and second stages of the present process appears to be due to the fact that the latter do not contain higher aromatic hydrocarbons such as naphthalene and anthracene, and that thereby the condensation is considerably simplified.

In the second stage, i. e. when working at increased pressure, pressures up to 300 atmospheres may be employed; for example pressures of from 50 to 100 atmospheres may be used.

Furthermore, in order to obtain a good transfer of heat and to increase the catalytic action of the free silicon, fillers containing free silicon may be interposed in the reaction vessel preferably so that the path of the gas is lengthened but so that no obstruction of the gas takes place. Obviously, other catalysts or fillers of other kinds may also be employed.

As initial materials may be mentioned gaseous and liquid, vaporizable paraffin hydrocarbons or gases or liquids containing them, as for example natural gases, coke oven gases, cracking gases, mineral oils, tar oils, cracking and destructive hydrogenation products of coals and hydrocarbons or distillation products of all of these liquid hydrocarbon products or fractions thereof as for example benzines. The first stage conversion may be carried out with these hydrocarbons alone; it may also be carried out in the presence of gases which take part in the reaction or which are inert, such as part of the gaseous products issuing from the first or second stage of the process according to the present invention or olefines, hydrogen, carbon monoxide, carbon dioxide, volatile sulphur compounds, steam, nitrogen or the like.

The process according to the present invention has the great advantage that products are formed which may be very satisfactorily worked up into most valuable motor fuels and lubricating oils, the latter being obtained for example by subjecting the said liquid products in the presence or absence of the residual gas obtained after the second stage to the action of condensing agents of the Friedel Craft type, such as iron chloride, aluminium chloride, double-compounds with ethylene or other gaseous olefines of aluminium chloride or iron chloride, or also zinc chloride, if desired together with bleaching earths and the like, at temperatures between 100° and 200° C. and, if desired after the removal of the sulphur compounds, separating them into low boiling benzine and very viscous oils (lubricating oils) by distillation after washing with liquors and water.

Moreover, especially when the plant is arranged in connection with a destructive hydrogenation plant for mineral oils for the utilization of the resulting waste gas containing methane homologues or of certain gas oil fractions, the liquid products obtained by the process hereinbefore described, if desired together with the residual gas may be returned to the destructive hydrogenation. In this manner there is an improvement of the benzine obtained, caused by the aromatic hydrocarbons from the polymerization process, and an enrichment of the lubricating oil fraction. The vessels comprising free metallic silicon may be constructed for example as described in the specification of the application Ser. No. 538,130, filed 18th May, 1931.

The nature of the invention will be further described with reference to the accompanying drawing which shows an arrangement of apparatus according to this invention, but the invention is not restricted to the particular arrangement shown.

A vertical tube 2 constructed of silicon bricks (prepared for example by mixing silicon powder with water glass and blowing the mass obtained after hardening, or by mixing enamel with silicon, silicides of heavy metals or silicon carbide, if desired with an addition of metals or metal oxides, and then subjecting the mixture to a heat-treatment) and coated externally with a highly refractory glaze of aluminium silicate which is impermeable to gas, the length of the tube being 8 meters and its internal diameter 20 millimeters, is heated externally by heating gases in a chamber 3 so that the temperature of the heating gases amounts to about 1000° C. at the entry 4 and about 850° C. at the outlet 5.

7850 liters of a gas mixture consisting of 41.0 per cent by volume of methane, 9.4 per cent of ethane, 24.9 per cent of propane, 13.6 per cent of butane, 1.3 per cent of ethylene, 1.9 per cent of propylene, 1.5 per cent of butylene, 3.0 per cent of hydrogen and 3.4 per cent of nitrogen are passed per hour through the tube 2 from a gasometer 1.

After being quenched in a cooling vessel 6 behind the chamber 3, the gas flows past a safety closure 7 and is led into the electrical tar separator 8 wherein the constituents in the form of mist are precipitated, collected in a collecting vessel 9 and led into a main collecting vessel 11 through a pipe 10.

After leaving the tar separator 8 the gas is led by means of a blower 12 at the rate of 12,000 liters per hour into a buffer gasometer 13 heated to from about 70° to 80° C.

The gas then has the composition: 48.4 per cent by volume of methane, 5.4 per cent of homologues of methane, 29.0 per cent of olefines, 15.0 per cent of hydrogen and 2.2 per cent of nitrogen.

The gas is then sucked from the gasometer 13 by a compressor 14 and is forced under a pressure of 100 atmospheres through a high-pressure separator 15 wherein the liquid products obtained in the preceding first stage and not separated in the tar separator 8 are separated. These are released from pressure in a low-pressure separator 16, the resulting liquid oil being led through the pipe 10 to the main collecting vessel 11 and the gas which had been dissolved therein through a pipe 17 back to the compressor 14.

In all, about 71 grams of liquid products are obtained from each cubic meter of initial gas in the first stage.

The gas, freed from liquid constituents, is then led to a high-pressure furnace 18 into which it enters with a speed of 4280 liters per hour under a pressure of about 50 atmospheres.

The said furnace 18 consists of a tube 19 about 8 meters long, of chromium nickel steel into which has been inserted, in the manner described in the specification of the application Ser. No. 538,130, filed 18th May, 1931, a tube 20 of silicon bricks (internal diameter=15 millimeters). The furnace 18 is heated by means of superheated steam produced in a superheater 21.

The waste gases from the chamber 3 may be employed for superheating the steam, the gases being passed through a pipe 27 as shown in the drawing.

The temperatures of the steam in the furnace 18 are: at the first inlet 22, about 630° C.; at the outlet 23, about 500° C.; at the second inlet 24, 550° C. and at the second outlet 25, 500° C. In the lower part 26 of the furnace 18, the said lower part 26 being about 80 centimeters in length, the steam is used as a cooling agent.

A small part of the reaction products is separated in a separator 28, whereby the liquid, released from pressure in a low-pressure separator 29, is led through the pipe 10 to the main collecting vessel 11 and the gas thus set free (mainly homologues of methane and olefines) is led back through the pipe 17.

The final gas, carrying with it the constituents of low boiling point, comes from the separator 28 and passes into a condenser 30 in which the liquid products are precipitated and they are separated in a separator 31.

The gas dissolved therein is removed by releasing the pressure in a separator 32. It is returned through the pipe 17 while the liquid reaction product is led through the pipe 10 to the main collecting vessel 11.

The gas mixture leaving the high pressure apparatus at the rate of 4250 liters per hour has the following composition:—65.6 per cent by volume of methane, 19.1 per cent of ethane, 1.7 per cent of propane, 4.6 per cent of ethylene, 0.8 per cent of propylene, 5.5 per cent of hydrogen and 2.7 per cent of nitrogen. 482 grams of liquid products are obtained from 4820 liters of the gas entering the high pressure apparatus.

Thus, in all, 10,600 liters of final gas and 1762 grams of liquid products are obtained from 7850 liters of initial gas per hour.

Of the liquid products, 44.2 per cent boil from 50° to 100° C., 74 per cent up to 160° C., 81 per cent up to 200° C. and 92.5 per cent up to 360° C.

They constitute a mixture of aliphatic and aromatic hydrocarbons (about 60 per cent). The latter consist mainly of benzene, toluene, xylene, ethyl benzene and styrene. The content of products which are present in a solid form is less than 0.1 per cent.

These products are then further treated with about 5 per cent of aluminium chloride in the form of the ethylene aluminium chloride compound in a lubricating oil plant 39 while simultaneously leading therethrough the residual gas leaving the high pressure apparatus, the liquid fraction being washed in 35 and separated by the usual methods into motor fuel and lubricating oil, while the residual gas is supplied either to a plant 36 for the production of acetylene, as for example by treatment in the electric arc, or to a plant 37 for the production of hydrogen.

In order to avoid the formation of ethane in the second stage it is advantageous to compress to about 300 atmospheres by means of the compressor 14 the gas obtained in the first stage, whereby the olefines as well as a part of the methane and hydrogen are washed out by the separated oil. The residual gas is directly released from pressure in the plants 36 or 37 while the olefines and methane are set free from the liquid products which are under a pressure of 300 atmospheres by releasing the pressure to the working pressure desired for the high-pressure apparatus (50 atmospheres), if desired while warming gently, so that a gas mixture almost free from hydrogen is available for further working up. By this means it is possible to increase the yields of liquid products and to reduce the content of ethane in the final gas.

In order more fully to explain the nature of the present invention the following examples are given. It is, however, to be understood that the invention is not restricted to these examples.

*Example 1*

36 kilograms per hour of a distillation residue boiling above 250° C. from an American mineral oil are sprayed into the top of a Cowper, 600 centimeters high and 22 centimeters in internal diameter, which is internally lined with silicon plates prepared by mixing silicon powder with a ceramic binding agent and subsequently glowing the mixture, and which is filled with 270 kilograms of silicon stones prepared in the same manner. The said Cowper is periodically heated to a mean temperature of 740° C.

From each ton of the said initial material are obtained 370 kilograms of an oil boiling above 325° C., 240 kilograms of lower boiling hydrocarbons, partly of aromatic nature, 48.5 per cent of these hydrocarbons boiling between 75° and 200° C. which are mainly recovered by the subsequent compression of the cracking gases and vapors, and 370 cubic meters of a cracking gas containing about 30 per cent by volume of ethylene and 11 per cent of higher gaseous olefines (the remainder consisting of hydrogen and hydrocarbons of the methane series). The debenzinized cracking gas is then further worked up in a second stage at about 500° to 550° C. and under a pressure of about 50 atmospheres in the manner described above, 300 grams of liquid hydrocarbons, partly of aromatic nature, of which 75 per cent boil up to 200° C. thereby being obtained from each cubic meter of cracking gas. From each ton of crude oil boiling above 250° C. 270 kilograms of liquid hydrocarbons boiling between 35° and 200° C. are thus obtained. No disturbances in the operation are encountered even after working for long periods of time.

Example 2

About 4 kilograms of an American straight run benzine having a strong tendency to knock are passed per hour in the vaporized form together with a carrier gas through a silicon tube prepared as above described and which is heated to a temperature between 650° and 750° C. As carrier gas may be employed the uncondensable part from the products obtained in a prior working stage of the said treatment of American straight run benzine, or also other gases, such as nitrogen, hydrogen, methane, or superheated steam.

From each 100 kilograms of the benzine employed about 88.8 kilograms of a benzine having the same boiling point range are obtained, which, after being freed from constituents prone to resinification, for example by treatment with bleaching earth, consists of a mixture of aliphatic hydrocarbons of saturated and unsaturated nature and small amounts of low boiling aromatic hydrocarbons, such as benzene and toluene. This benzene is practically free from sulphur and can satisfactorily be employed as non-knocking motor fuel. In addition thereto 11.2 kilograms of gas are obtained from each 100 kilograms of benzine, which consist of 38 per cent by weight of ethylene, 20 per cent of olefines, 20 per cent of methane and 21 per cent of gaseous homologues of methane, the remainder being hydrogen. The said gas is chemically condensed in the manner described above, about from 60 to 70 per cent of the olefines present in the gas thus being converted into liquid products. These liquid products may be added to the liquid hydrocarbons obtained in the first stage of the described treatment, thus still improving the properties of the latter as motor fuel.

What we claim is:—

1. In the production of low boiling non-knocking hydrocarbon liquids containing aromatic hydrocarbons by dehydrogenation of vaporized paraffinic hydrocarbons and subsequent condensation of the resulting dehydrogenated products the step of effecting said dehydrogenation and said condensation in separate vessels of which at least the parts coming into contact with the reacting substances are contructed of a material comprising free metallic silicon.

2. In the production of low boiling non-knocking hydrocarbon liquids containing aromatic hydrocarbons by dehydrogenation of vaporized paraffinic hydrocarbons and subsequent condensation of the resulting dehydrogenated products the step of effecting said dehydrogenation and said condensation in separate vessels of which at least the parts coming into contact with the reacting substances are constructed of a material comprising free metallic silicon and of which at least one is fitted with pieces of a material comprising free metallic silicon.

FRITZ WINKLER.
HANS HAEUBER.
PAUL FEILER.